Patented Sept. 20, 1932

1,877,946

UNITED STATES PATENT OFFICE

HEINRICH NERESHEIMER AND WILHELM SCHNEIDER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

HALOGEN DERIVATIVES OF THE ANTHRAQUINONEAZINE SERIES AND PROCESS OF MAKING SAME

No Drawing. Application filed July 25, 1930, Serial No. 470,764, and in Germany August 1, 1929.

The present invention relates to new halogen derivatives of condensation products of N-dihydro-1.2.2'.1'-anthraquinoneazine with formaldehyde or agents supplying formaldehyde, and process of producing same.

We have found that the vat dyestuffs obtainable by treating N-dihydro-1.2.2'.1'-anthraquinoneazine with formaldehyde which term is to be understood to comprise also agents supplying formaldehyde, such as for example paraformaldehyde, are converted into new vat dyestuffs having an excellent fastness to chlorine by treating them in the presence of solvents or suspending agents as for example organic liquids, sulphuric acid and the like, or in the absence of any such agents with halogen or agents supplying halogen. Halogenation is preferably carried out in sulphuric acid or derivatives thereof. The known halogenating catalysts may be added to the reaction mixture, for example iron or iodine; when halogenating in sulphuric acid $N_2O_3$ is employed with particular advantage as catalyst. The halogenated dyestuffs may be subjected to a purification as for example by precipitating them from their solutions in concentrated sulphuric acid with a restricted amount of water.

Valuable vat dyestuffs containing halogen different from those obtained by means of halogens or agents supplying halogens which as is well known are capable of replacing hydrogen by halogen are obtained when the said condensation products are treated with compounds containing halogen which preferably replace oxygen or hydroxyl groups by halogen, as for example the halides of phosphorus, the thionyl halides and the halogen hydracids. These dyestuffs dye the vegetable fibre fast shades which are usually more greenish blue than those of the initial materials. If desired they may be subjected to a subsequent treatment with free halogen or such halogenating agents as replace hydrogen by halogen, such as for example sulphuryl chloride. The preparation of the initial materials and their treatment according to the present invention may be carried out in one operation if desired.

In some cases the corresponding azines are obtained instead of the N-dihydroazines containing halogen which would have been expected, and these may be converted if depected, and these may be converted if desired into the dihydroazines by subsequent reduction either in the same or in a separate working operation. The azines, however, may also be employed as such for dyeing, since in the course of the dyeing process they are reduced to the N-dihydroazines.

In cases in which the reaction products are not uniform they may be purified or split up into their constituents as for example by precipitating them from solution in concentrated sulphuric acid with a restricted amount of water.

The following examples will further illustrate how the said invention may be carried out in practice, but the invention is not restricted to these examples. The parts are by weight.

Example 1

18 parts of paraformaldehyde are introduced at from 5° to 10° centigrade into a solution of 60 parts of N-dihydro-1.2.2'.1'-anthraquinoneazine (indanthrene blue RS, see Colour Index No. 1106) in 600 parts of 96 per cent sulphuric acid. After stirring for several hours the mixture is poured into water and the condensation product is isolated in the usual manner.

10 parts of bromine and 1 part of iodine are added to a suspension of 10 parts of the condensation product thus obtained in 330 parts of nitrobenzene, the reaction mixture is heated to 90° C. and stirred for about 4 to 5 hours at this temperature. After cooling the dyestuff which separates out is filtered off by suction, washed with benzene and converted into paste in the usual manner. If desired it may be converted into the N-dihydroazine by reduction with a mild reducing agent as for example sodium bisulphite. It dyes cotton from a blue vat somewhat more greenish blue shades that the intitial material. The fastness of the dyeings to chlorine is very good.

*Example 2*

10 parts of the condensation product employed in Example 1 in a finely divided state are ground in a ball mill for nearly 24 hours at about 25° C. with 24 parts of bromine, 0.4 part of iodine and 0.6 part of iron powder. The working up is carried out by taking the reaction product up in dilute sodium bisulphite solution, filtering by suction and washing. The new dyestuff dyes cotton from a blue vat shades which have a greener color and an appreciably better fastness to chlorine than the initial material.

*Example 3*

A stream of chlorine is led slowly through a suspension of 10 parts of the condensation product employed in Example 1 in 200 parts of trichlorbenzene for several hours at from 90° to 95° C. After cooling the new dyestuff is isolated in the manner described in Example 1. It yields on cotton from a blue vat dyeings which are similar to those obtained with the initial materials but which have a substantially better fastness to chlorine.

*Example 4*

20 parts of the condensation product employed in Example 1 are introduced into 200 parts of 78 per cent sulphuric acid and the whole is stirred for several hours at from 20° to 25° C. By filtering by suction and washing the residue with water a dyestuff is obtained which dyes cotton from a blue vat purer shades than the initial material.

10 parts of the product thus obtained are suspended in 200 parts of nitrobenzene, 16 parts of sulphuryl chloride are then added to the suspension, the latter is then heated to 90° C. and stirred for about 2 to 3 hours at the same temperature. The working up is carried out in the manner described in Example 1. The new dyestuff gives dyeings of very great fastness to chlorine on cotton from a blue vat. As regards shade it is very similar to the shade obtained with the intitial material.

Dyestuffs having different shades of color may be obtained with amounts of sulphuryl chloride smaller or greater than that specified. Thus by employing 24 parts of sulphuryl chloride a dyestuff is obtained which dyes cotton more reddish blue shades than the dyestuff described in the second paragraph of this example but which has the same fastness to chlorine.

*Example 5*

11 parts of water and then 22 parts of a solution of $N_2O_3$ in concentrated sulphuric acid which contains 246.6 grams of $N_2O_3$ per liter are added at 10° C. to a solution of 10 parts of the condensation product employed in Example 1, in 100 parts of sulphuric acid of 66° Bé. strength. The reaction mixture is then heated to 50° C. and a slow stream of chlorine is led in for several hours. The dyestuff which separates as a green blue flocculent precipitate, probably partially in the form of azine, when pouring the reaction mixture into water dyes cotton from a blue vat shades which are very similar to those obtained with the initial material but which have a much better fastness to chlorine.

*Example 6*

20 parts of phosphorus pentabromide are added to a suspension in 200 parts of carbon tetrachloride of 10 parts of the dyestuff obtainable by condensing N-dihydro-1.2.2'.1'-anthraquinoneazine (the indanthrene blue RS of commerce, see Colour Index, 1924 No. 1106) and formaldehyde in concentrated sulphuric acid at 50° C., and the reaction mixture is heated to boiling for several hours. After cooling, the dyestuff is filtered off by suction, washed with carbon tetrachloride and converted into the form of paste in the usual manner. It dyes cotton from a blue vat in more greenish blue shades than the initial material.

A dyestuff having similar properties is obtained by employing phosphorus pentachloride instead of phosphorus pentabromide.

If 20 parts of sulphuryl chloride be added to a suspension of 10 parts of the dyestuff obtained according to the first paragraph of this example in 200 parts of nitrobenzene and the reaction mixture be stirred for several hours at 90° C., a dyestuff is obtained which dyes cotton from a blue vat reddish blue shades having good fastness to chlorine.

*Example 7*

1 part of paraformaldehyde is added at 15° C. to a solution of 10 parts of N-dihydro-1.2.2'.1'-anthraquinoneazine (indanthrene blue RS of commerce) in 100 parts of 96 per cent sulphuric acid. After stirring at the said temperature for several hours the solution is poured into water, and the new dyestuff separates out in the form of a green blue flocculent precipitate. It is very similar to the dyestuff employed as initial material in the foregoing example.

10 parts of an approximately 20 per cent neutral aqueous paste of the resulting product are heated for several hours to 100° C.

under pressure with 100 parts of concentrated hydrochloric acid. After cooling, the reaction product is filtered off by suction and the residue is washed until neutral. The new dyestuff containing chlorine dyes cotton from a blue vat more reddish shades than the initial material.

*Example 8*

10 parts of N-dihydro-1.2.2'.1'-anthraquinoneazine, having the same degree of purity which the dyestuff Indanthrene blue RS of commerce has, are dissolved at 20° C. in 100 parts of 96 per cent sulphuric acid and after cooling the solution to 5° C., 3 parts of paraformaldehyde are added thereto. After stirring for several hours at from 5° to 10° C. the reaction mixture is poured onto ice and the dyestuff which separates out is worked up in the usual manner. It is very similar in its properties to the product obtained according to the first paragraph of Example 7 but it dyes more greenish blue shades than this.

10 parts of the dyestuff thus obtained are stirred for several hours at from 20° to 25° C. with 200 parts of thionyl chloride. When the reaction is completed the new dyestuff is filtered off by suction, well washed with benzene and converted into the form of paste in the usual manner. It dyes cotton from a blue vat shades which are more reddish and more fast to chlorine than those of the initial material.

If 10 parts of bromine be added to a suspension of 10 parts of this dyestuff in 330 parts of nitrobenzene and the reaction mixture be heated for several hours at 90° C. a dyestuff is obtained, after filtering by suction and washing the residue with benzene, which yields dyeings on cotton from a blue vat which are more greenish blue than those of the dyestuff described in the second paragraph of this example.

What we claim is:—

1. A process of producing halogen derivatives of the N-dihydro-1.2.2'.1'-anthraquinoneazine series, which comprises treating a condensation product of N-dihydro-1.2.2'.1'-anthraquinoneazine and formaldehyde with a halogenating agent.

2. A process of producing halogen derivatives of the N-dihydro-1.2.2'.1'-anthraquinoneazine series, which comprises treating a condensation product of N-dihydro-1.2.2'.1'-anthraquinoneazine and formaldehyde with a halogenating agent in the presence of a halogenating catalyst.

3. A process of producing halogen derivatives of the N-dihydro-1.2.2'.1'-anthraquinoneazine series, which comprises treating a condensation product of N-dihydro-1.2.2'.1'-anthraquinoneazine and formaldehyde with a halogenating agent capable of replacing oxygen by halogen.

4. A process of producing halogen derivatives of the N-dihydro-1.2.2'.1'-anthraquinoneazine series, which comprises treating a condensation product of N-dihydro-1.2.2'.1'-anthraquinoneazine and formaldehyde with a halogenating agent in a sulphuric acid.

5. A process of producing halogen derivatives of the N-dihydro-1.2.2'.1'-anthraquinoneazine series, which comprises treating a condensation product of N-dihydro-1.2.2'.1'-anthraquinoneazine and formaldehyde with a halogenating agent in a sulphuric acid in which $N_2O_3$ is dissolved.

6. As new articles of manufacture chloro derivatives of condensation products of N-dihydro-1.2.2'.1'-anthraquinoneazine and formaldehyde dyeing cotton from blue vats blue to greenish blue shades of substantially better fastness against chlorine than the unchlorinated products.

7. As a new article of manufacture the chloro derivative of the product obtainable by condensing 60 parts of N-dihydro-1.2.2'.1'-anthraquinoneazine with 18 parts of paraformaldehyde in 96 per cent sulphuric acid at between 5° and 10° C., the chloro derivative dyeing cotton from a blue vat blue shades similar to those of the said condensation product but of a substantially better fastness to chlorine, which chloro derivative is obtainable by acting on the said condensation product with chlorine in concentrated sulphuric acid containing $N_2O_3$.

8. As new articles of manufacture bromo derivatives of condensation products of N-dihydro-1.2.2'.1'-anthraquinoneazine and formaldehyde dyeing cotton from blue vats blue shades with a greener tinge and of substantially better fastness to chlorine than the unbrominated initial material, the said bromo derivatives being obtainable by brominating the said condensation products.

9. As new articles of manufacture halogen derivatives of condensation products of N-dihydro-1.2.2'.1'-anthraquinoneazine and formaldehyde dyeing cotton from blue vats blue to greenish-blue shades of substantially better fastness against chlorine than the unhalogenated initial material.

In testimony whereof we have hereunto set our hands.

HEINRICH NERESHEIMER.
WILHELM SCHNEIDER.